Figure 1:
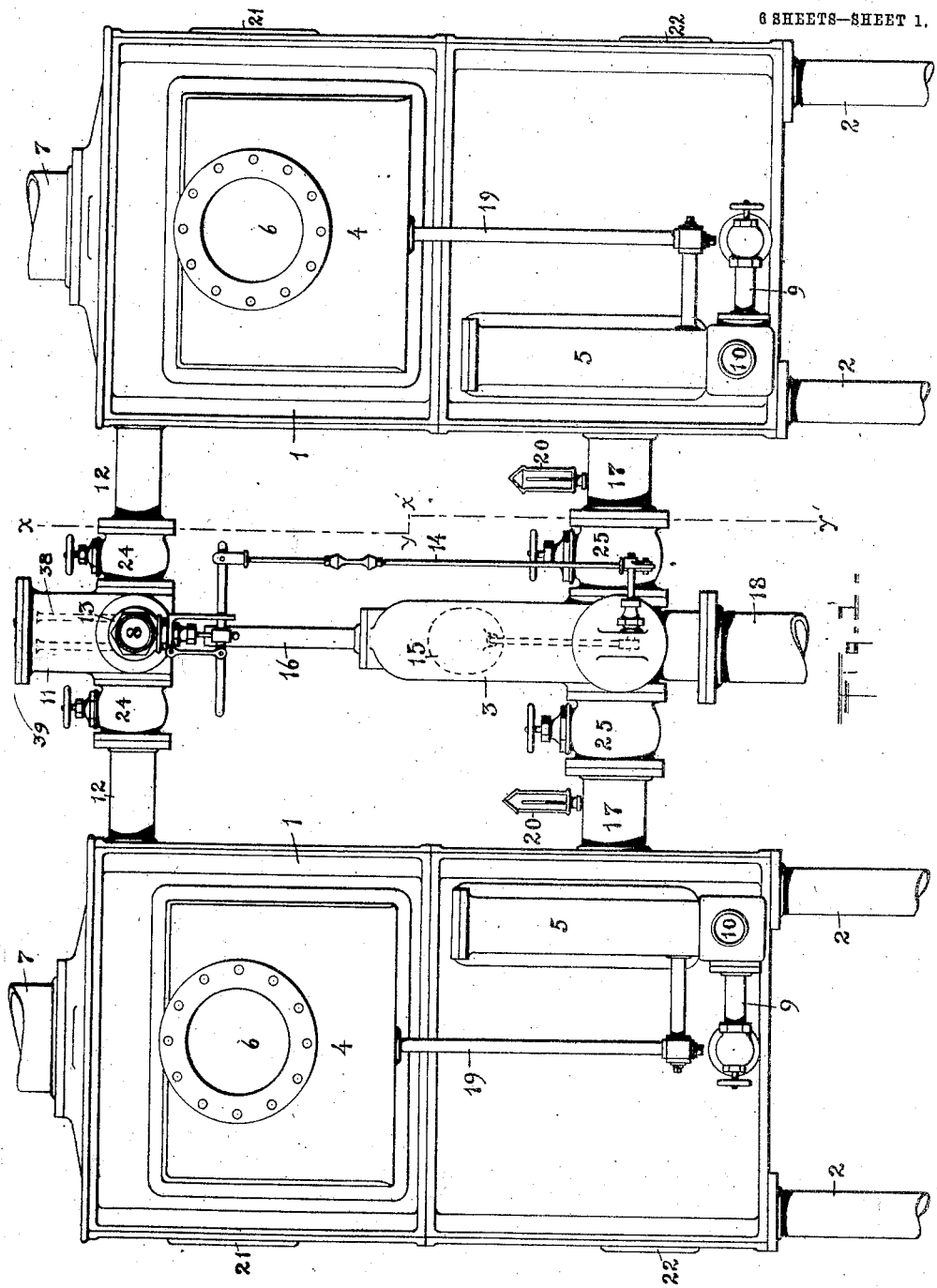

D. COCHRANE.
MEANS OF REGULATING, TREATING, AND DISTRIBUTING WATER OR OTHER FLUID.
APPLICATION FILED NOV. 22, 1905.

964,613.

Patented July 19, 1910.
6 SHEETS—SHEET 2.

D. COCHRANE.
MEANS OF REGULATING, TREATING, AND DISTRIBUTING WATER OR OTHER FLUID.
APPLICATION FILED NOV. 22, 1905.
964,613.
Patented July 19, 1910.
6 SHEETS—SHEET 3.
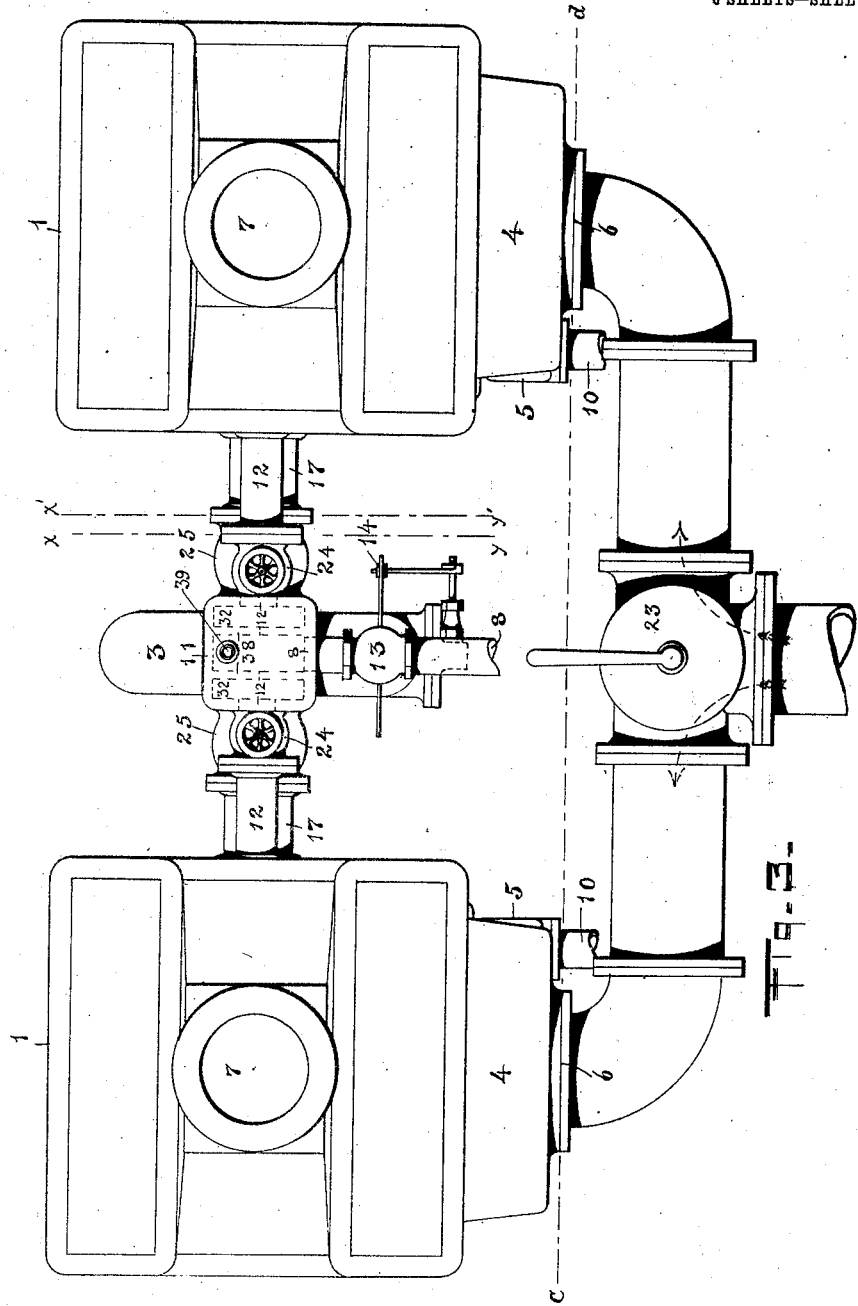

D. COCHRANE.
MEANS OF REGULATING, TREATING, AND DISTRIBUTING WATER OR OTHER FLUID.
APPLICATION FILED NOV. 22, 1905.
964,613.
Patented July 19, 1910.
6 SHEETS—SHEET 4.
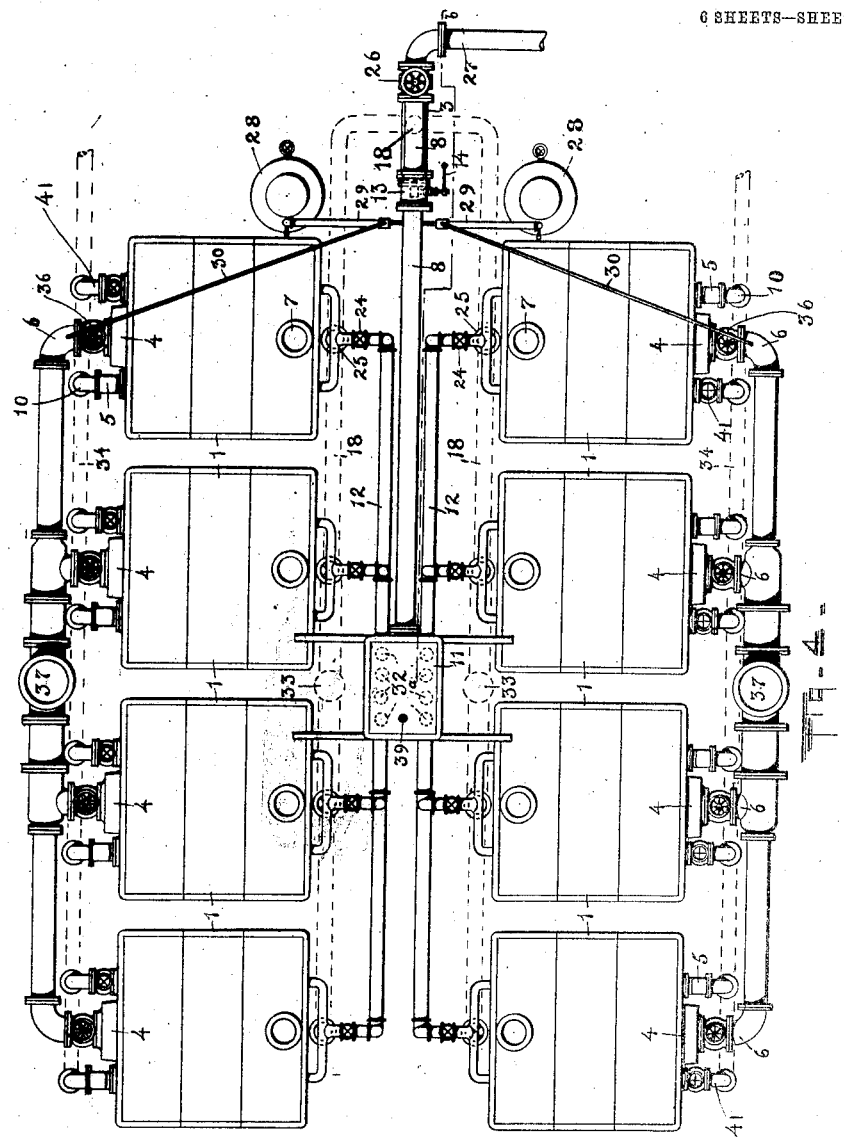

D. COCHRANE.
MEANS OF REGULATING, TREATING, AND DISTRIBUTING WATER OR OTHER FLUID.
APPLICATION FILED NOV. 22, 1905.
964,613.
Patented July 19, 1910.
6 SHEETS—SHEET 5.
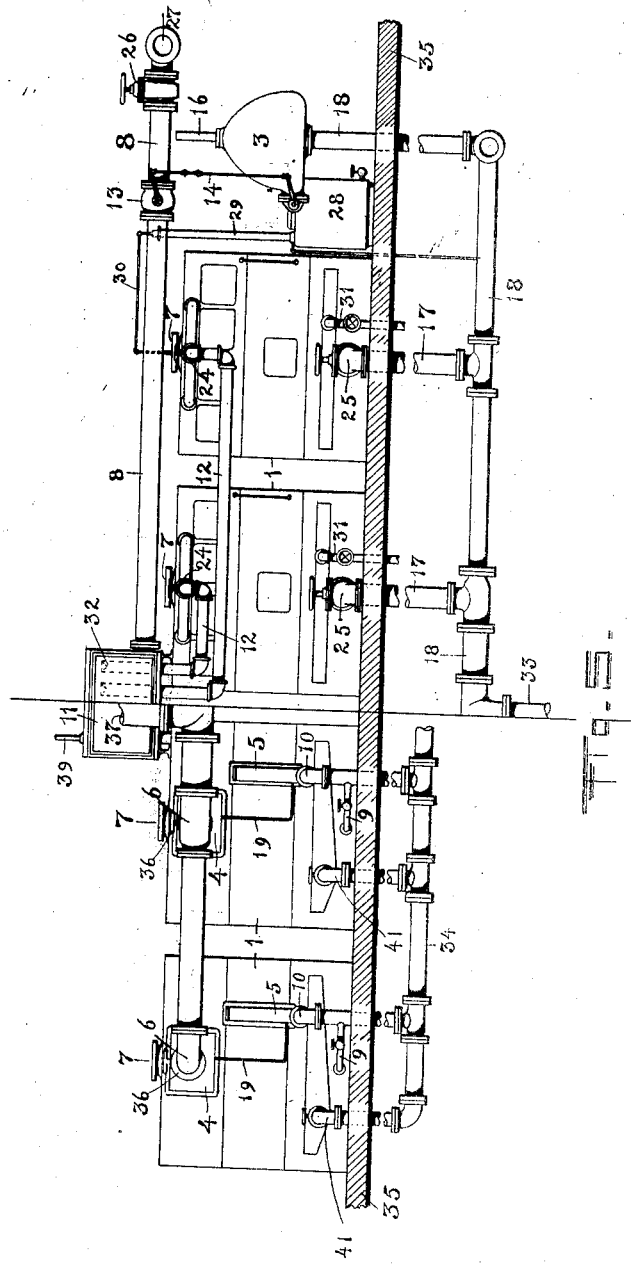
WITNESSES:
INVENTOR
David Cochrane
BY
ATTORNEY

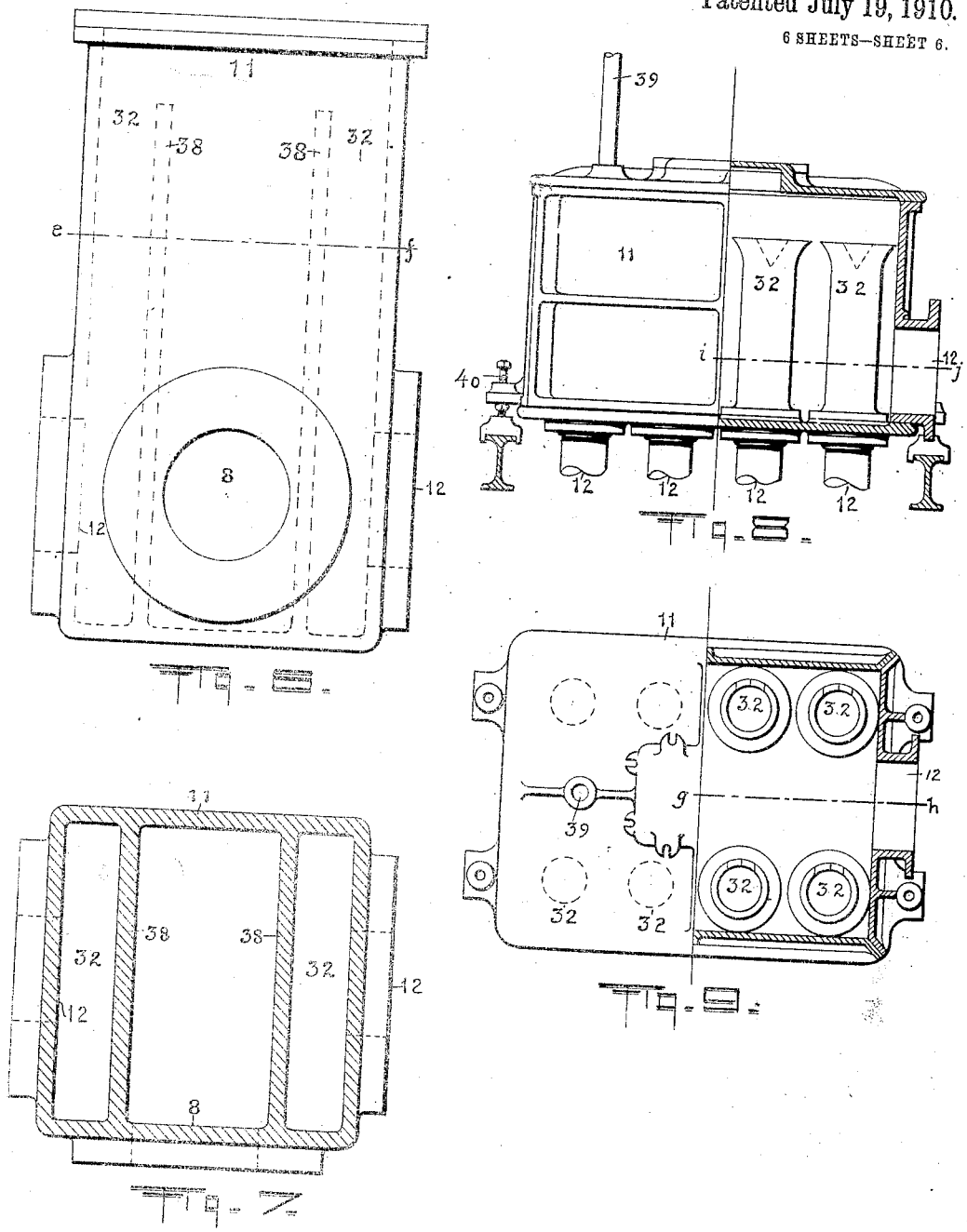

UNITED STATES PATENT OFFICE.

DAVID COCHRANE, OF PHILADELPHIA, PENNSYLVANIA.

MEANS OF REGULATING, TREATING, AND DISTRIBUTING WATER OR OTHER FLUID.

964,613.   Specification of Letters Patent.   Patented July 19, 1910.

Application filed November 22, 1905. Serial No. 288,534.

*To all whom it may concern:*

Be it known that I, DAVID COCHRANE, a citizen of the United States, and resident of and whose post-office address is No. 1814 North Twenty-seventh street, in the city of Philadelphia and State of Pennsylvania, have invented certain new and useful Improvements in the Means of Regulating, Treating, and Distributing Water or other Fluid, of which the following is a specification.

My invention relates to the means of regulating, treating and distributing water or other fluid, and especially where a plurality of heaters are utilized for treating feed water.

The primary objects of my invention are, first, to provide a simple, efficient and economical way of automatically supplying equal and proper amounts of water and steam simultaneously to all the heaters, so as to secure a uniformity of efficiency in all the heaters and insure that each shall do its proper proportion of the work that is to be done irrespective of its load; second, to permit one or more of the units to be readily cut out or temporarily eliminated from the operating combination without materially affecting the operation of the whole or reducing the necessary available supply.

Heretofore in large plants or in plants running continuously, where two or more heaters have been installed because of size or so that one or more could be cut out for cleaning, it has been found that when they discharge into a common suction or pump supply line (which is the usual practice), there is a large variation in the quantity of water passing through the different heaters if the supply to them is controlled by a float in each heater working a separate regulating valve. This is due to the fact that no system of valves and piping will insure the flow of equal quantities of water through each heater, and, of course, the regulating valve will only replace that quantity of water which is taken away. This is a serious drawback where the quantity of steam for heating the water is limited, because part of this steam may be wasted through its escape from the heater that is getting the least water,—for while there may be an equal division of the steam there may not be an equal division of the water,—and consequently there will be a surplus of steam in the heater to which is delivered the smaller quantity of water and a deficiency of steam in the heater which is receiving the larger quantity of water. Again, where chemical or other purification is desirable, it is obvious that the travel of the water through all of the heaters should be at the same rate so as to give equal time to liberate the gases, to bring the impurities into suspension, and to deposit them.

I attain my objects by employing the means and devices set forth in the accompanying description and drawings, in which like numbers of reference refer to like parts throughout the various views.

Figure 2:
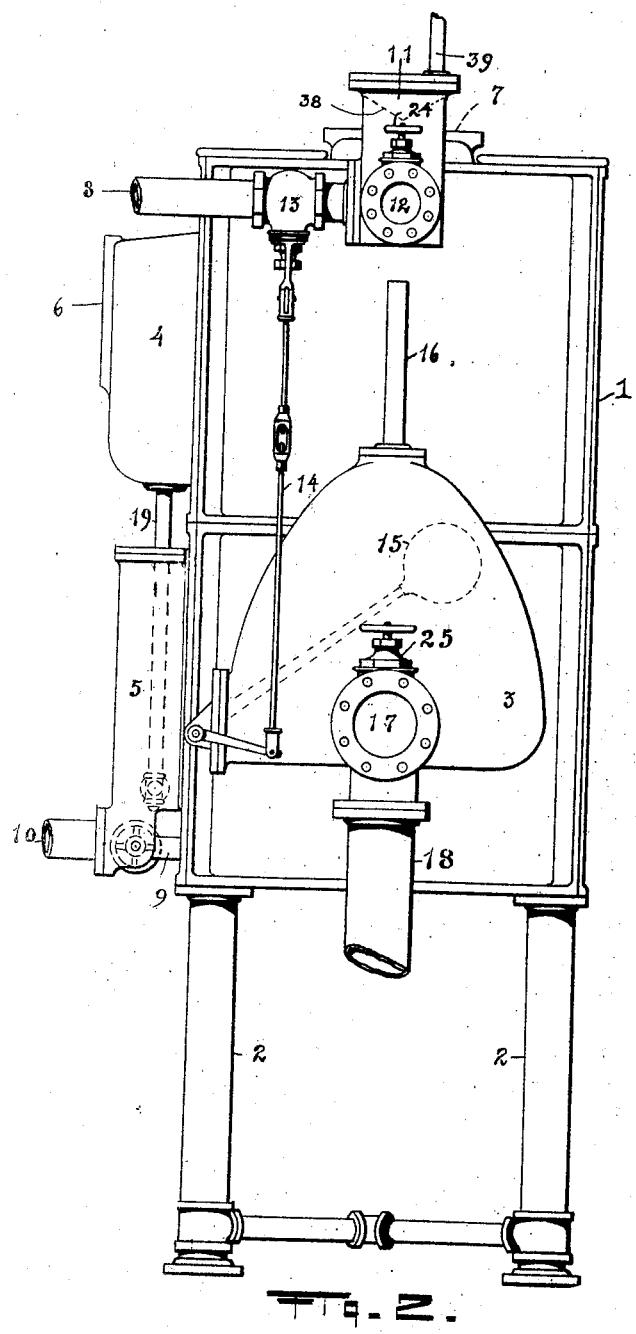

Figure 1— is a side elevation of a battery of two feed water heaters and their accessories to which my invention has been applied, taken from plane —*c*—*d*—, Fig. 3. Fig. 2— is an end elevation taken between the heaters from the planes —*x*—*y*—*x'*—*y'*—, Figs. 1 and 3, and showing the dividing box, float chamber, and connection. Fig. 3— is a plan view of the apparatus shown in Fig. 1, with the addition of the exhaust steam pipe and transfer valve. Fig. 4— is a plan view of a battery of eight heaters and accessories. Fig. 5— is a double side elevation of the battery shown in Fig. 4, one half being taken from the plane —*a*—*b*—, Fig. 4, and constituting the front view; the other half being the opposite side or back view. Fig. 6— is an enlarged detail in the side elevation of the dividing box shown in Figs. 1 and 2, as applied to batteries of two heaters, showing the interior divisions in dotted lines. Fig. 7— is a sectional view of this device taken in the plane —*e*—*f*—, Fig. 6. Fig. 8— is a view one half in elevation and one half in section of a dividing box for a battery of eight heaters, the part in section being taken in the plane —*g*—*h*—, Fig. 9. Fig. 9— is a plan view of the same, one half in section, the part in section being taken in the plane —*i*—*j*—, Fig. 8.

1— is the casing of the heater; 2— the tubular or other foundation or support. 3— is a float chamber; 4— oil separator; 5— water seal or trap; 6— exhaust inlet to separator; 7— exhaust outlet from heater; 8— cold water inlet to dividing box —11—; 9— blow off to waste; 10— waste pipe from water seal; 11— dividing box; 12— outlet from same, or in other words, cold water inlet to individual heaters; 13— regulating valve for cold water supply to dividing box;

14— rod and lever connection between float and regulating valve; 15— float shown in dotted lines in float chamber —3—; 16— vent to float chamber; 17— outlet from heaters; 18— outlet from float chamber to feed pump; 20— thermometer; 21— tray door; 22— cleaning door; 23— transfer valve in exhaust steam supply, Fig. 3, for cutting out heater; 24— valve in outlet pipe from dividing box to heater for cutting out heater; 25— valve in inlet pipe from heater to float chamber for same purpose.

In Figs. 4 and 5— 26 is the main valve for controlling the cold water supply from the main —27— to the whole system of installation. 28— is a chemical tank from which chemical solution is supplied to the cold water feed in the pipe —8—; 29— is a steam jacket for the chemical supply; 30— is the steam pipe,—in this case shown as leading from exhaust inlet pipe,—conveying steam to the jacket —29—; 31—31— are wash water conduits to the heaters; 32—32— are the entrances to the cold water supply pipes or conduits of the various heaters in the dividing box —11—; 33—33— are connections to the main pump suction into which the pipe system —18— empties, the outlet —17—17— from the various heaters in turn emptying into the system —18—; 34—34— is the waste system into which the various blow offs, wash outs, over flows, traps, drains, etc., empty. 35, Fig. 5, is the floor, here shown in section in order that the preferred arrangement of piping, etc., might be shown beneath. 36—36— are valves in the exhaust steam supply pipes leading through the oil separators —4—4— into the heaters. 37—37— are large conduits or mains feeding the smaller exhaust steam systems controlled by these valves —36—.

Referring to Figs. 6 and 7— 38 are partitions dividing the box —11—, but not extending entirely to the top of the box, so that the water may be divided equally between the two heaters fed through pipes at —12—12—. In this figure these partitions form, with the walls of the box, the conduits —32—32—, here preferably made integral with the box. In order to secure the regulation, equalization and other advantages in the handling of very small quantities of water, I prefer to provide these partitions with a —V— shaped upper edge. This, it will be seen, permits a very small quantity to pass over at the bottom of the —V—, increasing in quantity but remaining constant in proportion as the feed through —13— increases.

Figs. 8 and 9 show the same construction in the pipes —32—, which are provided with —V— shaped notches in the upper edge. 39— is a vent in the top of the dividing box —11—; 40, Fig. 8, is a leveling screw of which there are four for the purpose of adjustment. 41—41— are valved washout connections, emptying, like the traps or water seals —5—, into the waste pipe —34— (see Figs. 4 and 5).

It will, of course, be understood that, while the construction, arrangement, dimensions, and even designs of the various elements of apparatus may, and generally do differ where but two heaters and their accessories are employed from those employed in combinations of a larger number,—yet the principle, and the method by which that principle is carried out, may be and indeed are identical in all cases. This principle is the furnishing all the heaters of a system, irrespective of the number comprising that system, with substantially the same amount of water, under substantially the same amount of pressure, traveling at substantially the same rate, and in substantially the same time.

In Figs. 1, 2 and 3 the arrangement and operation of the apparatus by which my method is carried out are as follows:

I place a dividing box —11— intermediate the two heaters. To this box —11— I connect the cold water supply —8—, and from it I run the conduits —12—, one to each heater in the system. In the cold water supply conduit —8— is a valve —13— adapted to automatically regulate and control the supply of water passing therethrough into the box —11—. Beneath is the float box —3—; the float —15—, (indicated by dotted lines therein) moving with the water line in —3—, operates the valve —13— by means of the connecting mechanism —14—; when the water passes into the dividing box —11— (see also Figs. 6 and 7), it overflows the partitions —38— into the conduits —32—, thence flowing equally and simultaneously to both heaters. In them and in the float box —3— it rises to a certain level depending upon the demand made by the pumps, as is well known in the art, and need not be here and now more particularly set forth. The outlet of treated water now passes into the float box —3—; this being connected with both or all of the heaters of the system it follows that the height of the water line in the float box —3— is more or less dependent on the water lines, or, in other words, the amount of water in all the heaters, and the amount of water in the float box —3— will so adjust itself that the proper amount of water will be supplied (as is just explained, by the operation of the intermediary float —15—, float mechanism —14— and regulating valve —13—, to the dividing box —11—, and thence, by means of conduit —32—, to the pipes —12— and finally the heaters —1—. It also follows that,—since the water passing into box —11— through —13— is regulated according to the water line in the float box —3—, and this water line depends upon the amount of water drawn off from both the heaters through the pipe —18— to the pumps,—each heater receives the same amount of water, performs the same amount of duty, and the water lines or levels in each heater will so adjust themselves that the same quantity of water will pass from each heater, and it also follows that each heater will take its proper share of exhaust steam by induction, if there is no particular pressure in the main, and providing that there are no restrictions in any of the branch exhaust lines to the heaters, as each heater is capable of condensing an equal amount of steam.

In case it should be desired to cut out one of the heaters for purposes of cleaning, repair or any other reason, valves —24— in the incoming supply pipes to the heater and valves —25— in the outgoing supply pipes to the float box,—also the transfer valve —23— (see Fig. 3) in the exhaust steam pipe,—are provided by which the heater in question may be isolated or eliminated from the other members of the operative combination.

In Figs. 4 and 5, I have illustrated the system as adapted to a battery of eight heaters, and this number could, of course, be indefinitely increased. In this and similar arrangements, I prefer to place the float box —3— and regulating valve —13— at one end of the battery of heaters. The box —3— being connected through the pipes —18— and —17— with the various heaters, the water level will adjust itself in relation and such in extent as to insure the supply of the proper quantities of water, as already explained in the case of the two-heater system shown in Figs. 1, 2 and 3. The dividing box is placed so high as to give a sufficient head to the feed water entering the heaters, thus overcoming the variations in friction caused by the different lengths of the pipes —12—. Moreover, if desired, each pipe may be fitted with a water seal. Here also I may cut out any one or more of the heating units by closing valves —24—25— and —36— affecting the particular heating unit.

It will be clear that one of the advantages of my invention lies in the ability to cut out one or more heaters from a combination, yet without affecting the relative operation and efficiency of the remaining units, the uniformity and equality of whose operation remain constant because both the supply and outflow are common, simultaneous and equal, and are governed by the same condition,—that is, an equal supply through the intermediary of the same means: a common float box, float valve, and dividing box, and common pump suction.

Where I wish to use a chemical purifying apparatus I install it also by preference at one end as shown in Figs. 4 and 5.

As this device is well known, and as it does not in itself form a part of this invention, I will not here further describe it, than to say that the chemical solution enters the cold water pipe —8— at a point between the regulating valve —13— and the dividing box —11—.

It will be seen that the cold water feed through —8— is divided equally among the eight heaters in the dividing box —11— by means of the pipes —32—; and, since the float box —3— is common to all, as are the exhaust steam supply, the wastes, and the pump suction,—it follows that an equal division of work is accomplished.

Of course, it will be understood that I may depart from the exact illustrated arrangement, either in number, size, design or otherwise, without departing from the spirit of my invention; and indeed I do not limit myself to any particular tangible means or device. Moreover, I do not limit myself to the regulation, heating or other treatment of water, but include the regulation and treatment of any fluid in the manner claimed.

What I claim and desire to secure by Letters Patent is:

1. The combination of a plurality of heating units, and means for automatically and simultaneously furnishing an equal quantity of water to each unit.

2. The combination of a plurality of heating units, and means for furnishing an equal quantity of water to the various heating units, the total quantity varying according to and dependent upon the quantity of water discharged from the several heating units.

3. The combination of a plurality of heating units, and means for furnishing and regulating a supply of water automatically and simultaneously to each of the heating units, the total quantity varying according to and dependent upon the quantity of water discharged from the several units.

4. The combination of a plurality of heating units, and means for automatically controlling the admission of water to a common distributing point, according to and dependent upon the quantity of water discharged from all the heating units, and automatically furnishing equal quantities of water simultaneously to each of the heating units from the common distributing point.

5. In combination, a plurality of heating units, means for automatically and simultaneously furnishing equal quantities of water to each of said heating units; means for supplying automatically and simultaneously steam to each of said heating units, and means for discharging from each unit simultaneously an equal quantity of heated water.

6. The combination of a plurality of heaters; means intermediate of said heaters for receiving and distributing an equal amount of water automatically and simultaneously to each of said heaters; other means automatically operated to control said first means.

7. In combination with a plurality of heating units, a dividing box connected with each of said units; a common outlet for each of said heating units; means in said outlet for controlling the admission of water to said dividing box.

8. In combination with a plurality of heating units, a common distributing box for said heating units; means for cutting off one or more of said heating units from said common distributing box; means automatically controlling the supply of water to said distributing box, and a common outlet for said heating units.

9. The combination of a plurality of heaters; means for supplying an equal quantity of water to each of said heaters; a common discharge for all of said heaters; a float chamber connected with said common discharge; a float in said chamber; said float controlling said supply means, and means for cutting off one or more of said heaters from said common discharge.

10. The combination of a plurality of heaters, a common distributing box for said heaters; a water supply pipe for said distributing box; a valve in said pipe; means within said box for equally distributing a supply of fluid to each of said heaters; a common discharge pipe for said heaters, and means governed by the discharge to control the supply through the operation of the valve in the supply pipe.

11. The combination of a plurality of heaters, means for supplying an equal amount of steam to said heaters; a dividing box common to all of said heaters; means within said dividing box to cause the equal distribution of fluid to each of said heaters; an inlet for said dividing box; a valve in said inlet automatically operating to control the admission of fluid to said dividing box; a common discharge for all of said heaters; and means for cutting out one or more of said heaters from said common discharge.

12. The combination of a plurality of heating units, and means for furnishing a correlated quantity of water to each of said units, said means comprising a reservoir, a source of water supply for said reservoir, a plurality of partitions for said reservoir, said partitions having correlated overflow edges, and independent conduits for conveying the overflow from said partitions to the several heating units.

13. Means for supplying fluid to a plurality of points in correlated quantities comprising a reservoir, a source of fluid supply for said reservoir, a plurality of partitions for said reservoir having correlated overflow edges, and independent conduits for conveying the overflow from each of said partitions to the desired points.

14. Means for supplying fluid to a plurality of points in correlated quantities comprising a reservoir, a source of fluid supply to said reservoir, a plurality of partitions for said reservoir having notches through which the fluid may overflow, and independent conduits for conveying the overflow from each of said partitions to the desired points.

15. Means for supplying fluid to a plurality of points in correlated quantities, comprising a reservoir, a source of fluid supply to said reservoir, a plurality of partitions for said reservoir having correlated V shaped notches through which the fluid may overflow, and independent conduits for conveying the overflow from each of said partitions to the desired points.

16. The combination of a plurality of heating units; and means for furnishing an equal quantity of water to each unit, dependent upon a common water level.

17. The combination of a plurality of heating units; and means for simultaneously furnishing an equal quantity of water to each unit, dependent upon a common water level.

18. The combination of a plurality of heating units; and means for automatically and simultaneously furnishing an equal quantity of water to each unit dependent upon a common water level.

19. The combination of a plurality of heating units; and means for furnishing an equal quantity of water from a common distributing point to the various heating units, dependent upon a common water level.

Signed at Philadelphia in the county of Philadelphia, State of Pennsylvania, this 13th day of October, 1905.

DAVID COCHRANE.

Witnesses:
JOSEPH M. HEWLETT,
JAMES E. SARACOOL.